(12) United States Patent
Kondo et al.

(10) Patent No.: US 10,524,317 B2
(45) Date of Patent: Dec. 31, 2019

(54) HEATING COOKER

(71) Applicant: Panasonic Intellectual Property Management Co., Ltd., Osaka (JP)

(72) Inventors: Ryuta Kondo, Shiga (JP); Naoaki Ishimaru, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 431 days.

(21) Appl. No.: 15/510,544

(22) PCT Filed: Oct. 9, 2015

(86) PCT No.: PCT/JP2015/005138
§ 371 (c)(1),
(2) Date: Mar. 10, 2017

(87) PCT Pub. No.: WO2016/056246
PCT Pub. Date: Apr. 14, 2016

(65) Prior Publication Data
US 2017/0303348 A1 Oct. 19, 2017

(30) Foreign Application Priority Data
Oct. 10, 2014 (JP) .................. 2014-209417

(51) Int. Cl.
*H05B 6/68* (2006.01)
*F24C 15/00* (2006.01)
(Continued)

(52) U.S. Cl.
CPC ............ *H05B 6/687* (2013.01); *A47J 27/002* (2013.01); *A47J 27/04* (2013.01); *A47J 36/00* (2013.01);
(Continued)

(58) Field of Classification Search
CPC .......... A47J 37/00; A47J 27/002; A47J 27/04; A47J 36/00; A47J 2027/043
(Continued)

(56) References Cited

U.S. PATENT DOCUMENTS

2011/0146503 A1* 6/2011 Furukawa .............. F16J 15/324
99/447

FOREIGN PATENT DOCUMENTS

| EP | 1 741 986 A1 | 1/2007 |
| EP | 2 444 732 A2 | 4/2012 |

(Continued)

OTHER PUBLICATIONS

Extended European Search Report in corresponding European Application No. 15848196.0, dated Sep. 7, 2017, 9 pages.
(Continued)

*Primary Examiner* — Phuong T Nguyen
(74) *Attorney, Agent, or Firm* — Brinks Gilson & Lione (57) ABSTRACT

A heating cooker includes heating chamber configured to house a food, through-hole formed in a wall surface of heating chamber, an imager configured to capture an image in heating chamber through through-hole, air blower configured to blow air on an outside of heating chamber, and wind guide configured to guide wind generated by air blower. Thus, wind guide is disposed so that the wind from air blower forms an air curtain passing through space between the imager and through-hole.

5 Claims, 3 Drawing Sheets

(51) Int. Cl.
*H05B 6/64* (2006.01)
*F24C 7/08* (2006.01)
*A47J 27/00* (2006.01)
*A47J 27/04* (2006.01)
*A47J 36/00* (2006.01)
*F24C 15/32* (2006.01)

(52) U.S. Cl.
CPC ............ *F24C 7/085* (2013.01); *F24C 15/006* (2013.01); *H05B 6/642* (2013.01); *H05B 6/6447* (2013.01); *H05B 6/6479* (2013.01); *A47J 2027/043* (2013.01); *F24C 15/327* (2013.01)

(58) Field of Classification Search
USPC ........................... 99/325, 333, 341, 342, 468
See application file for complete search history.

(56) References Cited

FOREIGN PATENT DOCUMENTS

| | | | |
|---|---|---|---|
| JP | 3-247920 A | 11/1991 | |
| JP | 6-257756 | 9/1994 | |
| JP | 2001-056124 A | 2/2001 | |
| JP | 2003-056852 A | 2/2003 | |
| JP | 2004-263981 A | 9/2004 | |
| JP | 2004263981 | * 9/2004 | ................ F24C 7/02 |
| JP | 2008-292009 A | 12/2008 | |
| JP | 2009-008293 A | 1/2009 | |

OTHER PUBLICATIONS

International Search Report, and English language translation thereof, in corresponding International Application No. PCT/JP2015/005138, dated Dec. 8, 2015, 5 pages.

* cited by examiner

HEATING COOKER

This application is a 371 application of PCT/JP2015/005138 having an international filing date of Oct. 9, 2015, which claims the benefit of foreign priority of Japanese patent application JP2014-209417 filed on Oct. 10, 2014, the contents all of which are incorporated herein by reference.

TECHNICAL FIELD

The present invention relates to a heating cooker for cooking a food by heat.

BACKGROUND ART

A heating cooker has various components to check a state of a food in a heating chamber (refer to Patent Literature 1, for example). A heating cooker disclosed in Patent Literature 1 includes an infrared ray sensor for detecting a temperature of a food. The food is cooked by heat while the infrared ray sensor receives an infrared ray from the food through an infrared ray through-hole to detect the temperature of the food.

In this configuration, the heating cooker in Patent Literature 1 further includes a first air duct to send air into a heating chamber through the infrared ray through-hole formed in a wall surface of the heating chamber, and a second air duct diverging from the first air duct in a roughly perpendicular direction and provided between the infrared ray sensor and the infrared ray through-hole. Since the two air ducts are provided, scattered wastes of food in the heating chamber can be prevented from moving upward through an opening and staining the sensor. Furthermore, since not only the first air duct but also the second duct are provided to disperse the air ducts, a temperature in the heating chamber can be prevented from excessively dropping.

Here, the heating chamber for cooking the food experience a large change in circumstances including conditions such as temperature and moisture. As for a recent heating cooker, the circumstances in the heating chamber is likely to more largely change because more functions such as steam function have been added.

Thus, as one of the additional functions of the heating cooker, a heating cooker including an imager to confirm a state of a food in the heating chamber has been developed. The heating cooker including the imager is to be devised to adapt to the change in circumstances in the heating chamber such as to be devised to improve reliability of the imager and to be devised to improve visibility of the imager.

CITATION LIST

Patent Literature

PTL 1: Unexamined Japanese Patent Publication No. H03-247920

SUMMARY OF THE INVENTION

The present invention was made in view of the above problems, and it is an object of the present invention to provide a heating cooker including an imager, in which the imager is improved in reliability and visibility.

A heating cooker in the present invention includes a heating chamber configured to house a food, a through-hole formed in a wall surface of the heating chamber, an imager configured to capture an image in the heating chamber through the through-hole, an air blower configured to blow air on an outside of the heating chamber, and a wind guide configured to guide wind generated by the air blower. Thus, the wind guide is disposed so that the wind from the air blower forms an air curtain passing through a space between the imager and the through-hole.

In the heating cooker having this configuration in the present invention, the imager can be improved in reliability and visibility.

DETAILED DESCRIPTION OF THE PREFERRED EMBODIMENTS

Hereinafter, an exemplary embodiment of a heating cooker in the present invention will be described with reference to the attached drawings. Furthermore, the heating cooker in the present invention is not limited to a heating cooker having a configuration described in the following exemplary embodiment.

Figure 1:
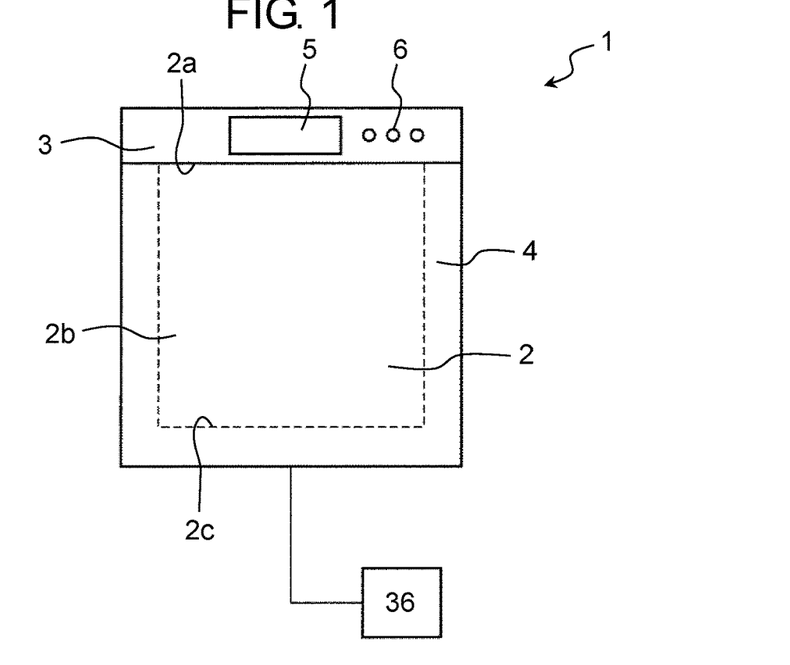
FIG. 1 is a front view of a heating cooker in an exemplary embodiment of the present invention.
Figure 2:
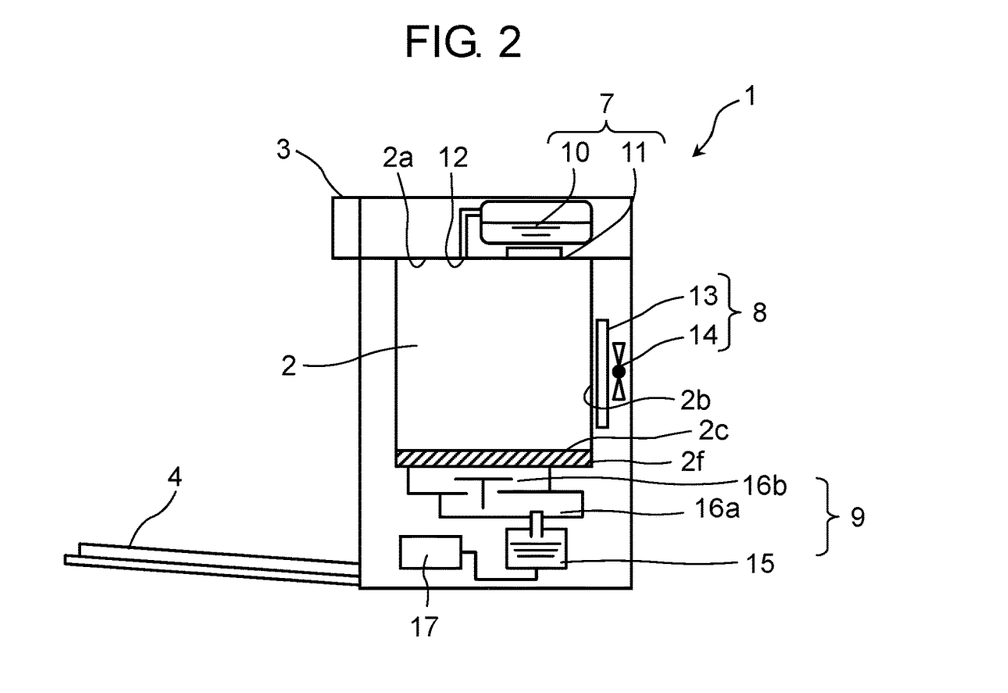
FIG. 2 is a view illustrating a cross-sectional structure taken from a side of the heating cooker in the exemplary embodiment of the present invention.

FIG. 1 is a front view of heating cooker 1 in the exemplary embodiment of the present invention. FIG. 2 is a view illustrating a cross-sectional structure of heating cooker 1 in the exemplary embodiment of the present invention taken from a side.

Heating cooker 1 is a device to cook a food (not illustrated) by heat in heating chamber 2.

As illustrated in FIGS. 1 and 2, heating cooker 1 includes body 3 incorporating heating chamber 2, and door 4.

Body 3 incorporates heating chamber 2 and serves as an outer case of heating cooker 1. As illustrated in FIG. 1, display 5 and operation unit 6 are provided on an upper front surface of body 3.

Display 5 displays an operating condition of heating cooker 1. Display 5 in the exemplary embodiment is composed of a liquid crystal screen. Operation unit 6 is used when a user operates heating cooker 1. Operation unit 6 in the exemplary embodiment is composed of a plurality of buttons to be pressed by the user. The user presses the button of operation unit 6 to control various operations of heating cooker 1. The contents of the operation of heating cooker 1 set in operation unit 6 are displayed on display 5.

In the exemplary embodiment, a wall surface of heating chamber 2 in body 3 is made of material selected from porcelain enamel steel sheet, stainless steel sheet, coated steel sheet, and the like.

Door 4 is fixed to body 3 openably. Door 4 in the exemplary embodiment is fixed to a lower front surface of body 3 so as to be rotatable in a front-back direction and has a handle (not illustrated) to be held by the user. The handle of door 4 is used when the user opens or closes door 4. FIG. 1 illustrates a state in which door 4 is closed (the user is not accessible to heating chamber 2), and FIG. 2 illustrates a state in which door 4 is open (the user is accessible to heating chamber 2).

As illustrated in FIG. 2, heating cooker 1 further includes steam supply unit 7, heater 8, and microwave supply unit 9 in body 3.

Steam supply unit 7 is a mechanism for supplying steam to heating chamber 2 to cook the food by heat. Steam supply unit 7 in the exemplary embodiment is disposed above upper wall surface 2a of heating chamber 2 and includes water tank 10 and steam generating heater 11.

Water tank 10 stores water to be used to generate steam. Steam generating heater 11 heats the water in water tank 10. As illustrated in FIG. 2, steam generating heater 11 is provided adjacently to water tank 10. When the water in water tank 10 is heated up to a predetermined temperature or higher by steam generating heater 11, the water is evaporated and becomes steam. The steam is supplied to heating chamber 2 through steam supply hole 12 provided in upper wall surface 2a of heating chamber 2 illustrated in FIG. 2. In addition, water can be resupplied to water tank 10 by the user.

Heater 8 is a mechanism for applying heat to heating chamber 2 by convection heat or radiation heat. Heater 8 in the exemplary embodiment is disposed behind (back side of) back wall surface 2b of heating chamber 2 and includes convection heater 13 such as a sheathed heater, and centrifugal fan 14. Back wall surface 2b of the heating chamber 2 has a plurality of holes (not illustrated) so that heating chamber 2 communicates with a space on the back side having heater 8.

In this configuration, air heated by convection heater 13 is applied into heating chamber 2 by centrifugal fan 14, so that heating chamber 2 and the food put in heating chamber 2 are heated by convection heat or radiation heat.

Microwave supply unit 9 is a mechanism for supplying a microwave to heating chamber 2 to cook the food by heat in heating chamber 2. Microwave supply unit 9 in the exemplary embodiment is provided below bottom wall surface 2c of heating chamber 2 and includes magnetron 15, waveguide 16a, and antenna 16b. Microwave supply unit 9 is covered with cover 2f made of material such as crystallized glass which transmits the microwave. Bottom wall surface 2c of heating chamber 2 is composed of an upper surface of cover 2f.

Magnetron 15 is one example of a microwave generator for generating a microwave. The microwave generated from magnetron 15 is applied toward antenna 16b. Antenna 16b diffuses the microwave from magnetron 15 into heating chamber 2. In this configuration, the microwave generated from magnetron 15 is diffused by antenna 16b and supplied into heating chamber 2 through cover 2f.

Heating cooker 1 in the exemplary embodiment further includes inverter 17. Inverter 17 is a circuit mechanism for driving magnetron 15.

Heating cooker 1 in the exemplary embodiment further includes controller 36 (refer to FIG. 1). Controller 36 controls overall operations for driving the various components in heating cooker 1. For example, controller 36 executes a program previously stored in a memory, based on contents entered into operation unit 6 so that inverter 17 is driven to implement a predetermined cooking plan.

In the configuration described above, heating cooker 1 in the exemplary embodiment can perform the steam heating by steam supply unit 7, convection/radiation heating by heater 8, and microwave heating by microwave supply unit 9, for the food in heating chamber 2. These heating methods can be implemented individually or in combination.

Next, imaging unit 18 provided in heating cooker 1 will be described with reference to FIGS. 3 and 4.

Figure 3:
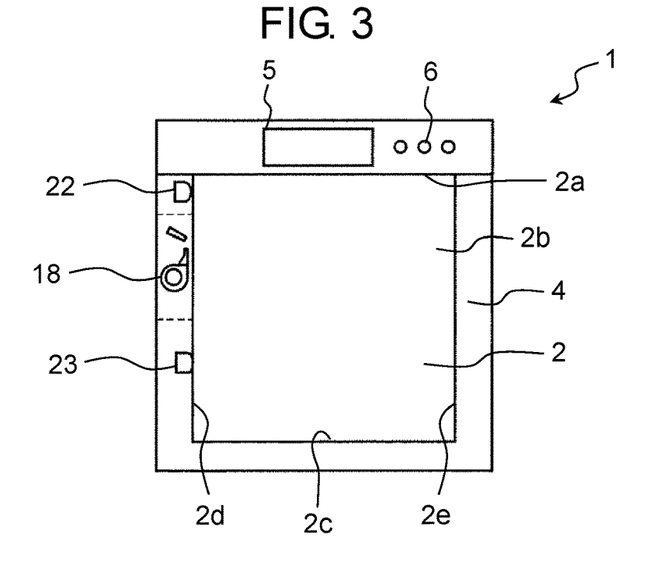
FIG. 3 is a view illustrating an internal configuration taken from a front of the heating cooker in the exemplary embodiment of the present invention.
Figure 4:
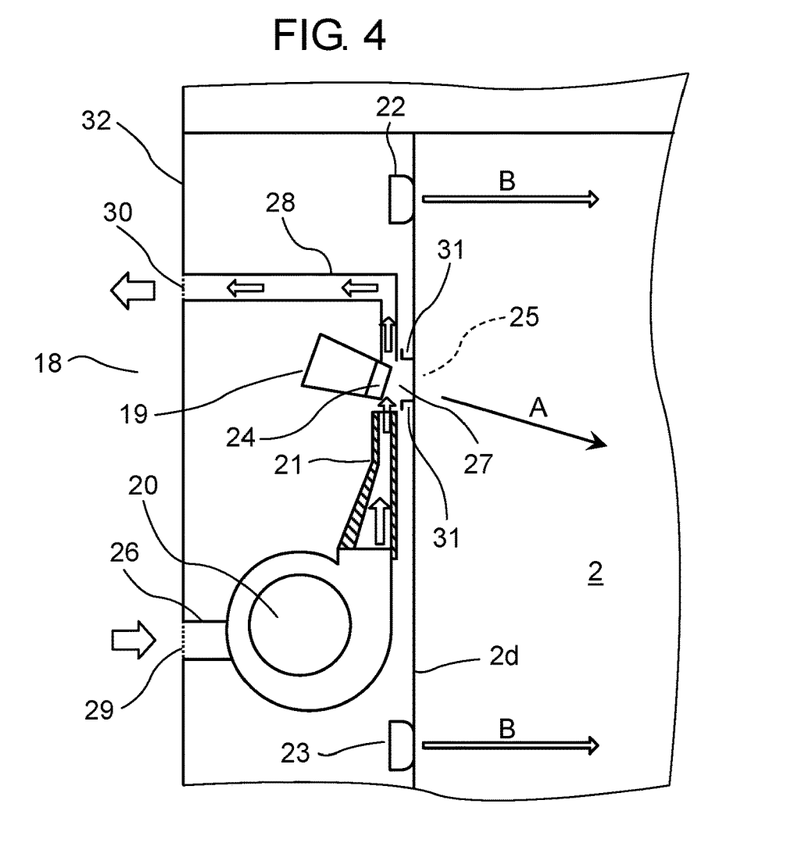
FIG. 4 is a view illustrating an enlarged cross-sectional configuration taken from the front of the heating cooker in the exemplary embodiment of the present invention.

FIG. 3 is a view illustrating an internal configuration of heating cooker 1 in the exemplary embodiment of the preset invention taken from a front surface, and FIG. 4 is an enlarged view illustrating a cross-sectional configuration of heating cooker 1 taken from the front surface.

Imaging unit 18 is a unit for taking a picture in heating chamber 2 to acquire an image in heating chamber 2. As illustrated in FIG. 3, imaging unit 18 in the exemplary embodiment is provided at a position adjacent to (on an outside of) one side wall surface 2d (left side in FIG. 3) of heating chamber 2. The image in heating chamber 2 captured by imaging unit 18 is displayed on display 5 and can be confirmed by the user.

FIG. 4 illustrates the enlarged view of a peripheral part of imaging unit 18 near side wall surface 2d of heating cooker 1 illustrated in FIG. 3. As illustrated in FIG. 4, imaging unit 18 in the exemplary embodiment includes camera 19, air fan 20, wind guide 21, and illumination lamps 22, 23.

Camera 19 is one example of the imager configured to capture the image in heating chamber 2. Camera 19 in the exemplary embodiment includes lens 24 and an imaging sensor (not illustrated). The imaging sensor detects a light acquired through lens 24 provided at a tip end of camera 19 to take the picture in heating chamber 2 and acquire the image in heating chamber 2. Through-hole 25 is formed in side wall surface 2d of heating chamber 2 so that the image can be captured through lens 24 of camera 19.

As illustrated in FIG. 4, camera 19 is fixed to body 3 on an outside of side wall surface 2d of heating chamber 2 to be away from heating chamber 2. Lens 24 provided at the tip end of camera 19 is disposed to face heating chamber 2 to fit the food in heating chamber 2 into a field of view through through-hole 25. In the example illustrated in FIG. 4, lens 24 is disposed so that an optical axis of lens 24 faces roughly a center of heating chamber 2. In FIG. 4, an imaging direction of camera 19 is represented by imaging direction A.

An angle formed by imaging direction A of camera 19 toward heating chamber 2, with horizontally extending bottom wall surface 2c (refer to FIG. 3) of heating chamber 2 (an angle formed with a horizontal direction) is referred to as an imaging angle of camera 19. Thus, according to the example illustrated in FIG. 4, the imaging angle is set at 25° downward. In addition, this imaging angle may be 0° to 50° downward, depending on an angle of view of camera 19.

Air fan 20 is fixed to body 3 and disposed below camera 19 to blow air upward.

Wind guide 21 is a member for guiding the wind from air fan 20. Wind guide 21 in the exemplary embodiment is fixed to an upside of air fan 20 and guides the wind from air fan 20 upward so that the wind can pass through space 27 between lens 24 of camera 19 and through-hole 25.

Thus, the wind from air fan 20 is guided by wind guide 21 and passes through space 27 between lens 24 of camera 19 and through-hole 25. Consequently, an air curtain is formed with respect to camera 19. This air curtain will be described in detail below.

Illumination lamps 22, 23 are members for irradiating heating chamber 2 with light and illuminating the inside of heating chamber 2. In the exemplary embodiment, illumination lamps 22, 23 are provided above and below camera 19, respectively. Illumination lamps 22, 23 in the exemplary embodiment are each composed of an LED.

As illustrated in FIG. 4, illumination lamps 22, 23 are provided on side wall surface 2d of heating chamber 2. The light from illumination lamps 22, 23 is a roughly parallel light toward side wall surface 2e (refer to FIG. 3) provided opposite to side wall surface 2d. The parallel light means a light moving in parallel, and the "roughly parallel light" in this specification means a light emitted from a point light source and converged by a lens like an LED having a lens. In FIG. 4, a direction of the light from illumination lamps 22, 23 is represented by irradiation direction B. In the exemplary embodiment, illumination lamps 22, 23 each emit the roughly parallel light moving in a horizontal direction.

Here, when an angle formed by irradiation direction B of illumination lamps 22, 23, with horizontally extending bottom wall surface 2c (FIG. 3) of heating chamber 2 (that is, an angle formed with the horizontal direction) is referred to as an irradiation angle of illumination lamps 22, 23, the irradiation angle is set at 0° in the example in FIG. 4.

Furthermore, imaging direction A of camera 19 described above and irradiation direction B of illumination lamps 22, 23 are set to have a difference in angle ranging from 0° to 25°. In other words, the irradiation angle of illumination lamps 22, 23, and the imaging angle of camera 19 are set to have a difference ranging from 0° to 25°.

Here, a wavelength of the light from illumination lamps 22, 23 preferably ranges from 380 nm to 780 nm. This range corresponds to a wavelength range of visible light, so that the light from illumination lamps 22, 23 can be imaged by camera 19 of heating cooker 1 and recognized by the user.

Furthermore, a wavelength showing maximum light emission intensity of the light from illumination lamps 22, 23 preferably ranges from 550 nm to 780 nm. Since this range corresponds to a range of a long wavelength, illumination lamps 22, 23 emit a red light. In the exemplary embodiment, a wavelength showing the maximum light emission intensity is set at 580 nm, for example so that the light falls within the range of the visible light wavelength and long wavelength. In this way, the red light from illumination lamps 22, 23 can be clearly recognized in heating chamber 2 by camera 19 and the user.

Furthermore, in the exemplary embodiment, the material of the wall surface of heating chamber 2 is the porcelain enamel steel sheet, for example. In this case, when the wavelength showing the maximum light emission intensity emitted from illumination lamps 22, 23 is set at 580 nm, reflectivity with respect to this wavelength can be about 18%. Thus, the light wavelength and the material of the inner wall are to be selected so that the reflectivity of the inner wall of heating chamber 2 with respect to the light wavelength emitted from illumination lamps 22, 23 is 20% or less.

As illustrated in FIG. 4, first air duct 26, a second air duct (which will be described below), and third air duct 28 are provided near the components of imaging unit 18.

First air duct 26 is provided to supply air from an outside of heating chamber 1 to air fan 20. First air duct 26 extends from air inlet 29 provided in outside wall surface 32 of body 3, to an upstream opening end of air fan 20. The air is made to pass through first air duct 26 and then moved into air fan 20. Air fan 20 generates wind from the air supplied from first air duct 26, and wind guide 21 guides the wind. That is, wind guide 21 guides the wind toward space 27 between lens 24 of camera 19 and through-hole 25. Thus, the second air duct is formed by air fan 20 and wind guide 21.

Third air duct 28 is provided to exhaust the air which has passed through space 27 between lens 24 of camera 19 and through-hole 25, to the outside of heating cooker 1. Third air duct 28 extends from space 27 between lens 24 of camera 19 and through-hole 25, to air outlet 30 provided in outside wall surface 32 of heating cooker 1.

In this configuration, after the air supplied from air inlet 29 is blown by air fan 20, the wind is guided by wind guide 21 (and second air duct) to pass through space 27 between lens 24 of camera 19 and through-hole 25. Thus, the air curtain for camera 19 is formed with respect to the space in heating chamber 2. After the wind has formed the air curtain, it is exhausted to the outside through air outlet 30.

Extension unit 31 is provided on side wall surface 2d of heating chamber 2 having through-hole 25 as illustrated in FIG. 4. Extension unit 31 extends from an inner circumference of through-hole 25 toward the outside (left direction on a sheet surface in FIG. 4) of heating chamber 2. In the exemplary embodiment, extension unit 31 is formed to rise perpendicularly from side wall surface 2d of heating chamber 2 (that is, extend in a horizontal direction).

Hereinafter, functions and effects of imaging unit 18 and its peripheral components will be described.

In heating chamber 2, the food and its ambient air are high in temperature especially during cooking by heat (such as 200° C.). In addition to the fact that the temperature is high, the steam supplied from steam supply unit 7, and steam generated when the food is heated by heater 8 and microwave supply unit 9 are likely to be highly filled in heating chamber 2. Under this circumstances, since heating cooker 1 in the exemplary embodiment has the structure in which through-hole 25 for camera 19 is provided in side wall surface 2d of heating chamber 2, air containing the hot air and the steam in heating chamber 2 could escape to the outside of heating chamber 2 through through-hole 25. When the air escapes to the outside of heating chamber 2, it could reach camera 19 (especially lens 24) provided near through-hole 25.

In order to prevent this, heating cooker 1 in the exemplary embodiment includes air fan 20 and wind guide 21 in imaging unit 18, and wind guide 21 is configured so that the wind from the air fan 20 forms the air curtain passing through space 27 between camera 19 and through-hole 25. Thus, the air in heating chamber 2 can be prevented from reaching camera 19 (lens 24 especially). That is, camera 19 can be prevented from being damaged (such as thermal damage to camera 19 and loss of transparency of lens 24) due to the hot air and the steam, so that camera 19 can be improved in reliability. Furthermore, when the air curtain is formed, the wind guided by wind guide 21 can be prevented from being drawn into heating chamber 2 through through-hole 25.

Furthermore, in a case where the imaging angle of camera 19 is set upward, the wind of the air curtain hitting against lens 24 of camera 19 is likely to escape to third air duct 28, but in the exemplary embodiment, the imaging angle of camera 19 is set downward. In this case, the wind of the air curtain hitting against lens 24 of camera 19 is likely to enter heating chamber 2 through through-hole 25 instead of escaping to third air duct 28. Thus, since the imaging angle of camera 19 is set downward, the hot air and the steam can be prevented from being diffused from through-hole 25 toward imaging unit 18.

Still furthermore, in the exemplary embodiment, since steam supply unit 7 is provided to supply the steam into heating chamber 2, heating chamber 2 is likely to be filled with a large amount of steam, but when the air curtain is formed as described above, the steam can be prevented from reaching camera 19 through through-hole 25. Thus, camera 19 can be improved in reliability and visibility.

Furthermore, in the exemplary embodiment, wind guide 21 guides the wind along (toward) a surface of lens 24 and guides the wind only in a direction to form the air curtain (in an upper direction on the sheet surface in FIG. 4). In other words, wind guide 21 guides the wind to form a one-way air flow which passes through the space between lens 24 and through-hole 25. Thus, the air curtain can be more surely formed, and its blocking function with respect to the space in heating chamber 2 can be enhanced.

Furthermore, in the case where the air curtain is formed, it is preferable to more surely prevent the wind forming the air curtain from being drawn into heating chamber 2 through through-hole 25. Thus, in the exemplary embodiment, as illustrated in FIG. 4, extension unit 31 extending outward from through-hole 25 is provided. When extension unit 31 is provided, the wind forming the air curtain can be further prevented from entering heating chamber 2 through through-hole 25, compared with a case where only through-hole 25 is provided without providing extension unit 31. As a result, the air curtain can be more surely formed and camera 19 can be improved in reliability.

Furthermore, in the exemplary embodiment, since microwave supply unit 9 is provided to supply the microwave, the microwave in heating chamber 2 is preferably prevented from escaping to the outside through through-hole 25. Thus, since extension unit 31 is provided, the microwave in heating chamber 2 can be prevented from escaping to the outside through through-hole 25. As a result, the microwave is prevented from reaching camera 19 which is likely to be affected by the microwave, so that a steady image can be obtained by camera 19.

Furthermore, in the exemplary embodiment, wind guide 21 is provided to guide the wind upward. As for commonly-used heating cooker 1, an upper part of heating chamber 2 in body 3 tends to be higher in temperature than a lower part. Thus, in the exemplary embodiment, the wind guide 21 is disposed to guide the wind upward, so that the part which is relatively higher in temperature in body 3 can be cooled down in heating cooker 1, compared with the case where the wind is guided downward. As a result, body 3 can be prevented from excessively increasing in temperature.

In addition to forming the air curtain as described above, in the exemplary embodiment, heating chamber 2 is illuminated by illumination lamps 22, 23. Thus, camera 19 can be improved in visibility.

In the exemplary embodiment, especially, illumination lamps 22, 23 are disposed on the same side as camera 19 disposed on side wall surface 2d, that is, disposed on side wall surface 2d of heating chamber 2 having through-hole 25. In this configuration, illumination lamps 22, 23 do not face camera 19, so that a positional relation with camera 19 is not a back-lit relation. Thus, camera 19 can be improved in visibility. Furthermore, to avoid the back-lit relation, illumination lamps 22, 23 may be disposed on upper wall surface 2a or bottom wall surface 2c other than side wall surface 2d of heating chamber 2. That is, when illumination lamps 22, 23 are disposed on the wall surface except for the wall surface (side wall surface 2e) facing the wall surface (side wall surface 2d) having camera 19, the back-lit relation is not provided.

In addition, a front-lit relation is provided as the positional relation with camera 19 when illumination lamps 22, 23 are disposed on the same side as camera 19 on sidewall surface 2d of heating chamber 2, rather than just being disposed at the position not facing camera 19. Mists formed when the steam in heating chamber 2 is condensed have a grain diameter of 1 μm to 100 μm, so that Mie scattering becomes geometric scattering, and forward scattering (scattering toward a travelling direction of light) largely occurs. Thus, since the front-lit relation is provided when illumination lamps 22, 23 are disposed on side wall surface 2d having camera 19, an effect of the forward scattering can be small. As a result, camera 19 can be further improved in visibility.

Furthermore, in the exemplary embodiment, as illustrated in FIG. 4, the difference between the illumination angle of illumination lamps 22, 23 and the imaging angle of camera 19 is set within the predetermined range (such as the range of 0° to 25°), so that a high-precision front-lit relation can be provided. As a result, camera 19 can be further improved in visibility.

As for the light emitted from illumination lamps 22, 23 in the exemplary embodiment, a wavelength showing the maximum light emission intensity ranges from 550 nm to 780 nm. This range is within the range of 380 nm to 780 nm which is the wavelength range of the visible light, so that heating chamber 2 can be clearly illuminated, and camera 19 can be further improved in visibility. In addition, the range of 550 nm to 780 nm is also the range of the long wavelength light, so that the color of the light emitted from illumination lamps 22, 23 is red. In this case, compared with a blue light emitted when the wavelength showing the maximum light emission intensity is set small (such as 380 nm to 550 nm), heating chamber 2 can be clearly illuminated, so that camera 19 can be further improved in visibility.

Furthermore, in a case where the illumination lamp is a while LED provided by combining a plurality of emission spectra, the same effect can be provided when a spectrum having a maximum emission energy is set to range from 580 nm to 780 nm. In the exemplary embodiment, illumination lamps 22, 23 emit the light roughly parallel to the horizontal direction and having the wavelength ranging from 380 nm to 780 nm corresponding to the visible light wavelength. Thus, when the roughly parallel light is applied with an LED in which directivity $\theta_{1/2}$ is 60° or less, scattering can be prevented and camera 19 can be further improved in visibility.

The light emitted from illumination lamps 22, 23 reaches the wall surface of heating chamber 2. In the exemplary embodiment, the light emitted from illumination lamps 22, 23 is roughly parallel to the horizontal direction, so that the light mostly reaches side wall surface 2e (refer to FIG. 3) facing side wall surface 2d. Here, in the exemplary embodiment, the wall surface in heating chamber 2 is made of the material of which the reflectivity with respect to the wavelength (such as 580 nm) of the light emitted from illumination lamps 22, 23 is 20% or less (more specifically, made of porcelain enamel steel sheet). When the reflectivity is set in this range, the light emitted from illumination lamps 22, 23 can be prevented from being reflected by the wall surface (especially, side wall surface 2e facing side wall surface 2d) in heating chamber 2, so that camera 19 can be further improved in visibility.

In the configuration as described above, steam supply hole 12 for supplying the steam is provided in upper wall surface 2a of heating chamber 2. That is, steam supply hole 12 is disposed in the wall surface of heating chamber 2 so as not to face side wall surface 2d having camera 19 serving as the imager. When steam supply hole 12 is disposed in this way, the steam supplied from steam supply hole 12 is not likely to be directly applied to camera 19, so that the visibility of camera 19 can be prevented from being harmfully affected by the steam.

As described above, heating cooker 1 in the exemplary embodiment includes heating chamber 2 for housing the food, through-hole 25 formed in side wall surface 2d of heating chamber 2, camera 19 (imager) for capturing the image in heating chamber 2 through through-hole 25, air fan 20 (air blower) for blowing the air on the outside of heating chamber 2, and wind guide 21 for guiding the wind from air fan 20. Furthermore, wind guide 21 is disposed so that the wind from air fan 20 forms the air curtain passing through space 27 between camera 19 and through-hole 25.

In this configuration, the air curtain is formed between camera 19 and through-hole 25, so that the air containing the hot air and the steam in heating chamber 2 can be prevented from reaching camera 19 through through-hole 25. Thus, in the case where camera 19 is provided, the air in heating chamber 2 can be prevented from reaching camera 19 and harmfully affecting camera 19, so that camera 19 can be improved in reliability and visibility.

Furthermore, heating cooker 1 in the exemplary embodiment includes heating chamber 2 for housing the food, through-hole 25 formed in side wall surface 2d of heating chamber 2, camera 19 (imager) for capturing the image in heating chamber 2 through through-hole 25, and illumination lamps 22, 23 (first illumination lamp) provided on side wall surface 2d having through-hole 25 to irradiate heating chamber 2 with light. Thus, heating cooker 1 further includes illumination lamps 22, 23 for illuminating the inside of heating chamber 2 in addition to camera 19, so that even when transparency in heating chamber 2 is reduced due to the steam in heating chamber 2, camera 19 can be improved in visibility. In addition, since illumination lamps 22, 23 are provided on side wall surface 2d having through-hole 25, the back-lit relation is not provided between camera 19 and the first illumination lamp, so that camera 19 can be further improved in visibility.

The present invention has been described with reference to the exemplary embodiment described above, but the present invention is not limited to the exemplary embodiment described above. For example, in the exemplary embodiment, steam supply unit 7 is provided, but the same effect can be provided in a cooking device in which steam is generated by a heater or a microwave heating, as a matter of course.

Furthermore, in the exemplary embodiment, the description has been given to heating cooker 1 including steam supply unit 7, heater 8, and microwave supply unit 9, but the present invention is not limited to this configuration, and for example, heating cooker 1 may include at least one of steam supply unit 7, heater 8, and microwave supply unit 9. That is, as long as heating cooker 1 includes at least one of the steam heating function, heater heating function, and microwave heating function, the configuration of the exemplary embodiment may be applied and the same effect can be provided.

Furthermore, in the exemplary embodiment, as illustrated in FIG. 4, illumination lamps 22, 23 are buried in side wall surface 2d, but the present invention is not limited to this case. For example, similar to camera 19 illustrated in FIG. 4, illumination lamps 22, 23 may be fixed at a position away from side wall surface 2d. That is, illumination lamps 22, 23 only need to be provided on the "side" of side wall surface 2d of heating chamber 2. Furthermore, as described above, illumination lamps 22, 23 may be provided on upper wall surface 2a or bottom wall surface 2c which does not face side wall surface 2d.

Furthermore, in the exemplary embodiment, through-hole 25 for camera 19 is only provided in side wall surface 2d, but the present invention is not limited to this case. For example, through-hole 25 may be provided not only in side wall surface 2d, but also partially in upper wall surface 2a (in a position ranging from side wall surface 2d to upper wall surface 2a). That is, through-hole 25 is to be provided in side wall surface 2d "at least partially".

Furthermore, in the exemplary embodiment, the light emitted from illumination lamps 22, 23 does not directly reach lens 24 of camera 19, but the present invention is not limited to this case. For example, illumination lamps 22, 23 may be disposed so that the emitted light directly reaches lens 24 of camera 19. In this case, a blocking unit for blocking the light from illumination lamps 22, 23 may be provided between illumination lamps 22, 23, and lens 24 of camera 19. Thus, camera 19 can be improved in visibility. For example, as the blocking unit, projection unit 37 projecting inward from side wall surface 2d of heating chamber 2 may be provided as illustrated in FIG. 5.

Figure 5:
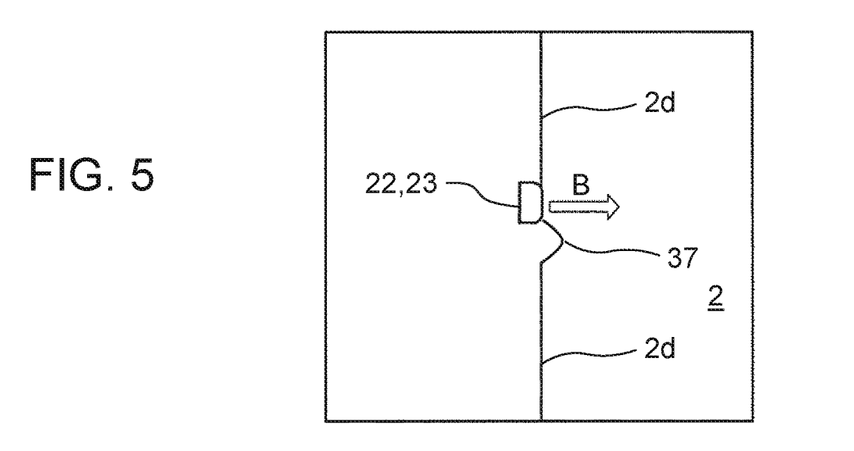
FIG. 5 is a view illustrating a configuration example of a projection unit serving as a blocking unit, in the exemplary embodiment of the present invention.

FIG. 5 is a view illustrating a configuration example of projection unit 37 serving as the blocking unit in the exemplary embodiment of the present invention.

Furthermore, in the exemplary embodiment, the wall surface itself of heating chamber 2 is made of the material having low reflectivity (such as porcelain enamel steel sheet) with respect to the light from illumination lamps 22, 23, but the present invention is not limited to this case. For example, the wall surface itself of heating chamber 2 may be made of any material (such as steel sheet plated with zinc or aluminum, or stainless steel sheet) different from the material having low reflectivity, and the wall surface may be covered (coated) with material having low reflectivity (such as fluorine resin). In this case also, the effect of preventing the light from illumination lamps 22, 23 from being reflected can be provided. Furthermore, when the material having low reflectivity is used, the material may be used for only side wall surface 2e facing side wall surface 2d having illumination lamps 22, 23, instead of being used for all the wall surfaces of heating chamber 2. In this case, even when the material having low reflectivity is not used for all the wall surfaces, the effect of preventing the light from illumination lamps 22, 23 from being reflected can be efficiently provided.

Furthermore, in the exemplary embodiment, camera 19 includes lens 24 and the imaging sensor as one example of the imager, but the present invention is not limited to this configuration. For example, a camera not having a lens may be used, as long as an image can be captured.

Furthermore, in the exemplary embodiment, extension unit 33 rises perpendicularly from side wall surface 2d, but the present invention is not limited to this configuration. For example, as illustrated in FIG. 6, extension unit 31 may be curved.

Figure 6:
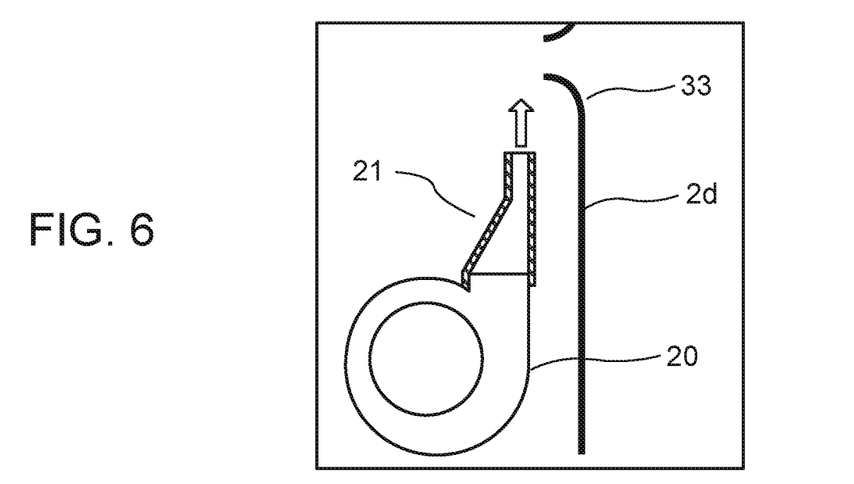
FIG. 6 is a view illustrating another example of an extension unit, in the exemplary embodiment of the present invention.

FIG. 6 is a view illustrating another example of extension unit 33 in the exemplary embodiment of the present invention.

More specifically, as illustrated in FIG. 6, extension unit 33 rises outward in a curved manner from a boundary with the wall surface of heating chamber 2. When extension unit 33 has this shape, compared with the case where extension unit 33 rises perpendicularly from side wall surface 2d of heating chamber 2, a turbulent flow can be prevented from being generated and an air flow can be smoothed in the region facing the wind from air fan 20. Thus, the wind (air curtain) formed by air fan 20 can be prevented from entering heating chamber 2.

Furthermore, in the exemplary embodiment, two illumination lamps 22, 23 are provided as the illumination lamp for illuminating the inside of heating chamber 2, but the number is not limited to two, and one or three or more illumination lamps may be provided.

Furthermore, in the exemplary embodiment, the illumination lamps 22, 23 (first illumination lamp) are provided on the side of side wall surface 2d of heating chamber 2, but the present invention is not limited to this configuration. For example, another illumination lamp (second illumination lamp) may be provided on the side of the wall surface other than side wall surface 2d. In this case, as illustrated in FIG. 7, second illumination lamps 34, 35 may be provided on side wall surface 2e facing first illumination lamps 22, 23 in heating chamber 2.

Figure 7:
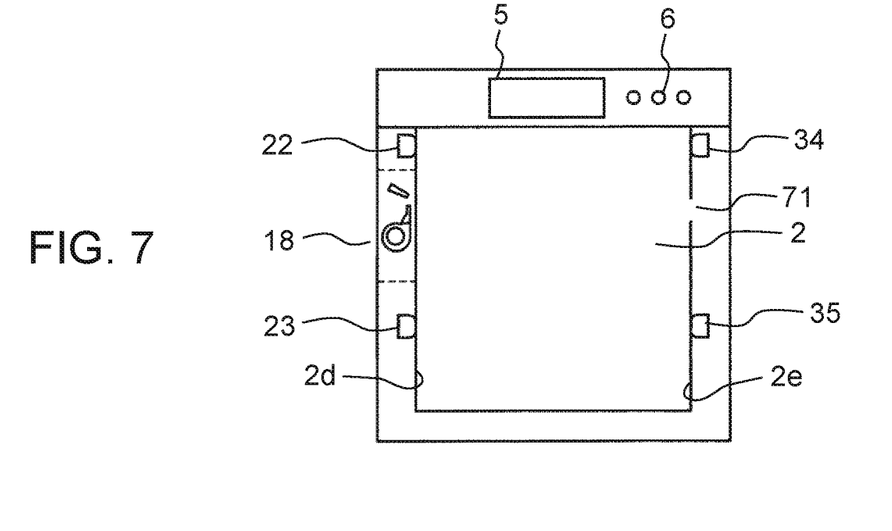
FIG. 7 is a view illustrating one example of a configuration of a second illumination lamp, in the exemplary embodiment of the present invention.

FIG. 7 is a view illustrating one example of a configuration of second illumination lamps 34, 35 in the exemplary embodiment of the present invention.

In this case, when camera 19 takes an image, first illumination lamps 22, 23 having the front-lit relation are turned on, while second illumination lamps 34, 35 having the back-lit relation are turned off, for example. More specifically, camera 19 and second illumination lamps 34, 35 may be controlled by controller 36 for controlling application of the lights from first illumination lamps 22, 23 and second illumination lamps 34, 35 so that the light from second illumination lamps 34, 35 is not applied when the image is captured by camera 19. With this control, the second illumination lamps disposed on the side opposite to the wall surface having camera 19 are turned off when the image is captured. Thus, the light from the illumination lamps can be prevented from providing the back-lit relation to camera 19, so that camera 19 can be further improved in visibility.

Furthermore, in the exemplary embodiment, through-hole 25 for camera 19 and steam supply hole 12 for steam supply unit 7 are only provided as through-holes in the wall surface of heating chamber 2, but the present invention is not limited to this case, and another through-hole may be provided. For example, a discharge hole 71 for the steam may be provided in the wall surface of heating chamber 2 so that the steam in heating chamber 2 can be discharged to the outside of heating chamber 2. Thus, in the case where steam supply unit 7 is provided especially, the steam can be discharged from the discharge hole 71, so that an amount of the steam which could be discharged from through-hole 25 for camera 19 can be reduced. Thus, camera 19 can be improved in reliability. Furthermore, the discharge hole 71 in this case is preferably formed in an upper part higher than ½ of the wall surface of heating chamber 2 (higher than half of the wall surface) because the steam moves upward in general.

In addition, in the exemplary embodiment, the specific values regarding the wavelength and the angle of the light and the specific example of the material of the wall surface of heating chamber 2 are described, but they are only the example and the present invention is not limited to those examples.

Furthermore, in the exemplary embodiment, display 5 is composed of the liquid crystal screen, but the present invention is not limited to this case, and another component having a display function may be used. In addition, in the exemplary embodiment, operation unit 6 is composed of the plurality of buttons, but the present invention is not limited to this case, and another component which is operable by the user may be used.

As described above, the heating cooker in the exemplary embodiment includes the heating chamber configured to house the food, the through-hole formed in the side wall surface of the heating chamber, the imager that captures the image in the heating chamber through the through-hole, the air blower that blows the air on the outside of the heating chamber, and the wind guide for guiding the wind from the air blower. Furthermore, the wind guide is disposed so that the wind from the air blower forms the air curtain passing through the space between the imager and the through-hole.

In this configuration, since the air curtain is formed between the imager and the through-hole, the air containing the hot air and the steam in the heating chamber can be prevented from reaching the camera through the through-hole. Thus, in the case where the imager is provided, the air in the heating chamber can be prevented from reaching the imager, and the imager can be prevented from being harmfully affected, so that the imager can be improved in reliability and visibility.

Furthermore, the heating cooker may further include the extension unit extending from the inner circumference of the through-hole toward the outside of the heating chamber.

In this configuration, the wind from the air blower can be further prevented from entering the heating chamber.

Furthermore, the extension unit may be curved outward at the boundary with the wall surface of the heating chamber.

In this configuration, compared with the case where the extension unit rises perpendicularly from the wall surface of the heating chamber, the air flow can be smoothed in the region facing the wind from the air blower. Thus, the wind from the air blower can be further prevented from entering the heating chamber.

Furthermore, the air blower may be disposed below the imager, and the wind guide may be disposed to guide upward the wind from the air blower.

In this configuration, the wind from the air blower is guided upward, so that the upper part of the heating cooker which is likely to increase in temperature can be efficiently cooled with the wind from the air blower.

Furthermore, the microwave supply unit configured to supply the microwave may be provided in the heating chamber.

Still furthermore, the steam supply unit configured to supply the steam may be provided in the heating chamber.

In this configuration, the amount of steam is likely to increase in the heating chamber, but since the air curtain is formed, the steam can be prevented from reaching the imager through the through-hole. Thus, the imager can be improved in reliability and the imager can be improved in visibility.

Furthermore, the discharge hole may be further provided in the wall surface of the heating chamber to discharge the steam in the heating chamber to the outside of the heating chamber.

In this configuration, in the case where the steam supply unit is provided, since the steam can be discharged from the discharge hole, the amount of steam which could pass through the through-hole for the imager can be reduced. As a result, the imager can be improved in reliability.

INDUSTRIAL APPLICABILITY

As described above, according to the present invention, the effect of improving the reliability and visibility of the imager can be especially provided, so that the heating cooker is suitably used for the cooker for cooking the food by heat.

The invention claimed is:

1. A heating cooker comprising:
    a heating chamber configured to house a food;
    a through-hole formed in a wall surface of the heating chamber;
    an imager configured to capture an image in the heating chamber through the through-hole;
    an air blower configured to blow air on an outside of the heating chamber;
    a wind guide configured to guide wind generated by the air blower, wherein:
        the wind guide is disposed so that the wind from the air blower forms an air curtain passing through a space between the imager and the through-hole,
        a portion of the wind from the wind guide goes into the heating chamber via the through-hole, and
        a portion of the wind from the wind guide exhausts through an air duct and an air outlet;
    a steam supply unit configured to supply steam, in the heating chamber; and
    a discharge hole formed in the wall surface of the heating chamber to discharge the steam in the heating chamber to the outside of the heating chamber.

2. The heating cooker according to claim 1, further comprising
    an extension unit extending from an inner circumference of the through-hole toward the outside of the heating chamber.

3. The heating cooker according to claim 2, wherein
    a boundary between the extension unit and the wall surface of the heating chamber is curved outward.

4. The heating cooker according to claim 1, wherein
    the air blower is disposed below the imager, and
    the wind guide is disposed to guide the wind from the air blower upward.

5. The heating cooker according to claim 1, further comprising
    a microwave supply unit configured to supply a microwave, in the heating chamber.

\* \* \* \* \*